(12) United States Patent
Izaki et al.

(10) Patent No.: US 10,274,659 B2
(45) Date of Patent: Apr. 30, 2019

(54) POLARIZING PLATE COMPRISING AN OPTICAL FUNCTIONAL FILM AND A PROTECTIVE FILM HAVING A SPECIFIED MOISTURE PERMEABILITY

(71) Applicant: NITTO DENKO CORPORATION, Ibaraki-shi, Osaka (JP)

(72) Inventors: Akinori Izaki, Ibaraki (JP); Ryohei Sawazaki, Ibaraki (JP); Atsushi Yasui, Ibaraki (JP); Yuki Kida, Ibaraki (JP); Takeharu Kitagawa, Ibaraki (JP); Takuya Mori, Ibaraki (JP)

(73) Assignee: NITTO DENKO CORPORATION, Osaka (JP)

( * ) Notice: Subject to any disclaimer, the term of this patent is extended or adjusted under 35 U.S.C. 154(b) by 50 days.

(21) Appl. No.: 15/512,328

(22) PCT Filed: Sep. 18, 2015

(86) PCT No.: PCT/JP2015/076629
§ 371 (c)(1),
(2) Date: Mar. 17, 2017

(87) PCT Pub. No.: WO2016/043305
PCT Pub. Date: Mar. 24, 2016

(65) Prior Publication Data
US 2017/0276851 A1 Sep. 28, 2017

(30) Foreign Application Priority Data

Sep. 19, 2014 (JP) .................................. 2014-191734
Sep. 16, 2015 (JP) .................................. 2015-182853

(51) Int. Cl.
*G02B 5/30* (2006.01)

(52) U.S. Cl.
CPC ....... *G02B 5/3041* (2013.01); *C08G 2170/40* (2013.01)

(58) Field of Classification Search
CPC .......... G02B 1/08; G02B 5/30; G02B 5/3025; G02B 5/3033; G02B 5/3041; G02B 5/305;
(Continued)

(56) References Cited

U.S. PATENT DOCUMENTS 7,767,286 B2 8/2010 Wada
8,314,987 B2 11/2012 Goto et al.
(Continued)

FOREIGN PATENT DOCUMENTS

CN 1950729 A 4/2007
CN 101432643 A 5/2009
(Continued)

OTHER PUBLICATIONS

Explanation of Circumstances Concerning Accelerated Examination dated Mar. 5, 2018, in counterpart Japanese Application No. 2015-182853, with English translation. (14 pages).
(Continued)

*Primary Examiner* — Arnel C Lavarias
(74) *Attorney, Agent, or Firm* — Westerman, Hattori, Daniels & Adrian, LLP

(57) ABSTRACT

A polarizing plate including an optical functional film and a polarizing film (polarizer), the polarizing plate being thin and excellent in durability of the polarizing film. The polarizing plate includes an optical functional film, a pressure-sensitive adhesive layer, a polarizing film, and a protective film in the stated order, in which: the polarizing film has a thickness of 15 μm or less; the pressure-sensitive adhesive layer has a thickness of 15 μm or less; the optical functional film has a moisture permeability of 200 g/m²/24

(Continued)

h or less; and the protective film has a moisture permeability of 1,000 g/m$^2$/24 h or less.

7 Claims, 3 Drawing Sheets

(58) Field of Classification Search
CPC .... G02B 5/3083; G02B 27/28; G02B 27/283; G02B 27/286
USPC ............ 359/483.01, 489.01, 489.07, 489.08, 359/489.11, 489.2; 428/1.3, 1.31; 349/96, 97, 98, 99, 100, 101, 102, 103, 349/117, 118, 119, 120, 121, 122
See application file for complete search history.

(56) References Cited

U.S. PATENT DOCUMENTS

| | | | |
|---|---|---|---|
| 8,320,042 | B2 | 11/2012 | Goto et al. |
| 8,331,025 | B2 | 12/2012 | Kobayashi et al. |
| 8,379,169 | B2 | 2/2013 | Kitagawa et al. |
| 8,411,360 | B2 | 4/2013 | Kitagawa et al. |
| 8,520,169 | B2 | 8/2013 | Kitagawa et al. |
| 8,520,171 | B2 | 8/2013 | Kitagawa et al. |
| 8,687,152 | B2 | 4/2014 | Izaki et al. |
| 8,709,567 | B2 | 4/2014 | Kitagawa et al. |
| 8,721,816 | B2 | 5/2014 | Kitagawa et al. |
| 8,771,454 | B2 | 7/2014 | Goto et al. |
| 8,852,374 | B2 | 10/2014 | Goto et al. |
| 8,861,076 | B2 | 10/2014 | Nagase et al. |
| 9,023,168 | B2 | 5/2015 | Kitagawa et al. |
| 9,194,989 | B2 | 11/2015 | Yasen et al. |
| 9,283,740 | B2 | 3/2016 | Kitagawa et al. |
| 9,442,234 | B2 | 9/2016 | Kitagawa et al. |
| 9,442,235 | B2 | 9/2016 | Kitagawa et al. |
| 9,459,390 | B2 | 10/2016 | Kitagawa et al. |
| 2008/0007828 | A1 | 1/2008 | Tsujiuchi et al. |
| 2008/0158485 | A1 | 7/2008 | Wada |
| 2008/0278672 | A1 | 11/2008 | Yano et al. |
| 2009/0040611 | A1* | 2/2009 | Kitamura ............ B29D 11/0073 359/489.2 |
| 2009/0066888 | A1 | 3/2009 | Kunai et al. |
| 2010/0232018 | A1 | 9/2010 | Kobayashi et al. |
| 2011/0109847 | A1 | 5/2011 | Nagase et al. |
| 2011/0128477 | A1 | 6/2011 | Izaki et al. |
| 2011/0205628 | A1 | 8/2011 | Yasen et al. |
| 2012/0055607 | A1 | 3/2012 | Kitagawa et al. |
| 2012/0055608 | A1 | 3/2012 | Kitagawa et al. |
| 2012/0055621 | A1 | 3/2012 | Goto et al. |
| 2012/0055622 | A1 | 3/2012 | Kitagawa et al. |
| 2012/0055623 | A1 | 3/2012 | Kitagawa et al. |
| 2012/0056211 | A1 | 3/2012 | Kitagawa et al. |
| 2012/0056340 | A1 | 3/2012 | Kitagawa et al. |
| 2012/0057104 | A1 | 3/2012 | Kitagawa et al. |
| 2012/0057107 | A1 | 3/2012 | Kitagawa et al. |
| 2012/0057231 | A1 | 3/2012 | Goto et al. |
| 2012/0057232 | A1 | 3/2012 | Goto et al. |
| 2012/0058291 | A1 | 3/2012 | Kitagawa et al. |
| 2012/0058321 | A1 | 3/2012 | Goto et al. |
| 2013/0100529 | A1 | 4/2013 | Kitagawa et al. |
| 2013/0114139 | A1 | 5/2013 | Kitagawa et al. |
| 2014/0098331 | A1 | 4/2014 | Hisanaga et al. |
| 2014/0186568 | A1 | 7/2014 | Kitagawa et al. |
| 2015/0152299 | A1 | 6/2015 | Saito et al. |
| 2015/0183199 | A1 | 7/2015 | Kitagawa et al. |
| 2015/0293407 | A1* | 10/2015 | Iida .................. G02F 1/133634 349/96 |
| 2016/0054494 | A1 | 2/2016 | Kitagawa et al. |
| 2016/0103258 | A1 | 4/2016 | Kitagawa et al. |

FOREIGN PATENT DOCUMENTS

| | | |
|---|---|---|
| CN | 102053298 A | 5/2011 |
| CN | 102177449 A | 9/2011 |
| JP | 2003-149438 A | 5/2003 |
| JP | 2005-306483 A | 11/2005 |
| JP | 2009-122663 A | 6/2009 |
| JP | 2009-139658 A | 6/2009 |
| JP | 2009-175721 A | 8/2009 |
| JP | 2009-258570 A | 11/2009 |
| JP | 2010-072091 A | 4/2010 |
| JP | 4691205 B1 | 6/2011 |
| JP | 5048120 B2 | 10/2012 |
| JP | 2013-200445 A | 10/2013 |
| JP | 2013-231761 A | 11/2013 |
| JP | 2014-010207 A | 1/2014 |
| JP | 2014-129505 A | 7/2014 |
| JP | 2015-040283 A | 3/2015 |
| JP | 2015-078252 A | 4/2015 |
| JP | 2015-143848 A | 8/2015 |
| KR | 10-2008-0063166 A | 7/2008 |
| KR | 10-2014-0034485 A | 3/2014 |
| TW | 201131218 A | 9/2011 |
| TW | 201343370 A | 11/2013 |

OTHER PUBLICATIONS

International Search Report dated Dec. 15, 2015, issued in counterpart International application No. PCT/JP2015/076629, with English translation, (3 pages).
Office Action dated Jul. 24, 2018, issued in counterpart Korean Application No. 10-2017-7006557, with English translation. (13 pages).
Office Action dated Dec. 18, 2018, issued in counterpart Chinese application No. 201580050566.8, with English translation. (19 pages).
Office Action dated Dec. 28, 2018, issued in counterpart Korean application No. 10-2017-7006557, with English translation. (12 pages).
Office Action dated Feb. 18, 2019, issued Taiwanese application No. 104130975, with English translation.

* cited by examiner

POLARIZING PLATE COMPRISING AN OPTICAL FUNCTIONAL FILM AND A PROTECTIVE FILM HAVING A SPECIFIED MOISTURE PERMEABILITY

TECHNICAL FIELD

The present invention relates to a polarizing plate.

BACKGROUND ART

In recent years, the thinning of an image display apparatus, in particular, an image display apparatus for mobile applications has been progressing, and hence there has been a growing requirement for the thinning of a polarizing plate to be used in the image display apparatus. As a method of thinning the polarizing plate, there is given, for example, a method involving thinning a polarizer (polarizing film) itself, or arranging a protective film for protecting the polarizer only on one side of the polarizer (e.g., Patent Literature 1 and Patent Literature 2). A polarizing plate having a protective film arranged only on one side thereof, i.e., a polarizing plate including a polarizer and the protective film arranged on one side of the polarizer (hereinafter sometimes referred to as "one-side protected polarizing plate") is used as described below. A pressure-sensitive adhesive layer is directly formed on the polarizer, and the polarizing plate is laminated on any other member.

Meanwhile, the use of an optical laminate, which includes a lamination of an absorption-type polarizing plate and a reflection-type polarizing plate functioning as a brightness enhancement film, has been proposed for the purpose of improving the brightness of an image display apparatus (e.g., Patent Literature 3). Also in such optical laminate, for achieving its thinning, the use of the one-side protected polarizing plate as the absorption-type polarizing plate is conceivable.

CITATION LIST

Patent Literature

[PTL 1] JP 4691205 B2
[PTL 2] JP 5048120 B2
[PTL 3] JP 2003-149438 A

SUMMARY OF INVENTION

Technical Problem

The inventors of the present invention have found that, in the case of such polarizing plate as described above, the pressure-sensitive adhesive layer for bonding the one-side protected polarizing plate and any other member, such as the reflection-type polarizing plate, to each other absorbs moisture, and particularly when the polarizing film of the polarizing plate is thin (e.g., its thickness is 15 µm or less), moisture that has passed the pressure-sensitive adhesive layer breaks an iodine-PVA complex in the polarizing film (polarizer) to deteriorate the polarizing film. Such deterioration of the polarizing film becomes remarkable in a corner portion of the polarizing film, and has started to become a problem particularly in recent years where the frame narrowing of an image display apparatus has been required.

The present invention has been made to solve the conventional problem, and a primary object of the present invention is to provide a polarizing plate including an optical functional film and a polarizing film, the polarizing plate being thin and excellent in durability of the polarizing film.

Solution to Problem

A polarizing plate according to one embodiment of the present invention includes an optical functional film, a pressure-sensitive adhesive layer, a polarizing film, and a protective film in the stated order, in which: the polarizing film has a thickness of 15 µm or less; the pressure-sensitive adhesive layer has a thickness of 15 µm or less; the optical functional film has a moisture permeability of 200 g/m²/24 h or less; and the protective film has a moisture permeability of 1,000 g/m²/24 h or less.

In one embodiment, the pressure-sensitive adhesive layer has a 50 µm-converted moisture permeability of 1,500 g/m²/24 h or less.

In one embodiment, the pressure-sensitive adhesive layer has a 50 µm-converted moisture permeability equal to or less than a 50 µm-converted moisture permeability of the optical functional film.

In one embodiment, the pressure-sensitive adhesive layer has a thickness of 5 µm or less.

In one embodiment, the polarizing film includes an iodine-based polarizing film.

In one embodiment, the optical functional film has a thickness of 40 µm or less.

In one embodiment, the protective film has a thickness of 40 µm or less.

In one embodiment, the polarizing plate of the present invention has a thickness of 150 µm or less.

Advantageous Effects of Invention

According to the present invention, the polarizing plate having the following feature can be obtained: the polarizing plate includes the optical functional film, the pressure-sensitive adhesive layer having a thickness of 15 µm or less, the polarizing film, and the protective film in the stated order, and hence the deterioration of the polarizing film due to moisture particularly in a corner portion thereof is suppressed. In more detail, the polarizing plate includes the protective film on one surface of the polarizing film, and hence the penetration of moisture into the surface is blocked, and for example, even when another pressure-sensitive adhesive layer is famed outside the protective film, the deterioration of the polarizing film due to moisture can be suppressed. In addition, the optical functional film is arranged on the other surface of the polarizing film through intermediation of the pressure-sensitive adhesive layer having a thickness equal to or less than a predetermined value, and hence the penetration of moisture into the surface and an end portion of the pressure-sensitive adhesive layer is suppressed. Further, the deterioration of the polarizing film due to moisture can be significantly suppressed by setting the moisture permeability of each of the optical functional film and the protective film to a value equal to or less than a predetermined value.

In addition, according to the present invention, the polarizing plate that is thin can be obtained because of the following reason: the polarizing plate includes the pressure-sensitive adhesive layer and the polarizing film each having a small thickness, and includes only one protective film.

DESCRIPTION OF EMBODIMENTS

A. Entire Construction of Polarizing Plate

Figure 1A:
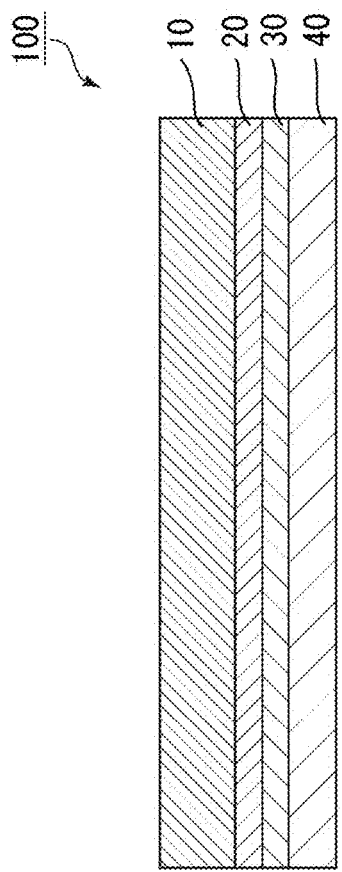
FIG. 1 are each a schematic sectional view of a polarizing plate according to one embodiment of the present invention.

FIG. 1(a) is a schematic sectional view of a polarizing plate according to one embodiment of the present invention. A polarizing plate 100 illustrated in FIG. 1(a) includes an optical functional film 10, a pressure-sensitive adhesive layer 20, a polarizing film 30, and a protective film 40 in the stated order. Examples of the optical functional film 10 include films, such as a linearly polarized light-separating film and a retardation film. The optical functional film 10 can also function as a film configured to protect the polarizing film 30. The pressure-sensitive adhesive layer 20 has a thickness of 15 µm or less. The polarizing film 30 has the following function: the film separates incident light into two polarized light components perpendicular to each other, transmits one polarized light component, and absorbs the other polarized light component. The polarizing film 30 has a thickness of 15 µm or less. The protective film 40 has a function of protecting the polarizing film 30, and may be arranged on the polarizing film by being bonded thereto through intermediation of, for example, an adhesive layer (not shown).

The linearly polarized light-separating film is a film having the following feature: the film has a transmission axis and a reflection axis, can transmit polarized light in a specific polarization state (polarization direction) and reflect light in any other polarization state, and can function as a brightness enhancement film. When the linearly polarized light-separating film is used as the optical functional film 10, the linearly polarized light-separating film and the polarizing film are preferably laminated so that the transmission axis of the linearly polarized light-separating film and the absorption axis of the polarizing film may be substantially perpendicular to each other. The phrase "substantially perpendicular" as used herein includes the case where an angle famed between two optical axes is 90°±2°, and the angle is preferably 90°±1°.

In the present invention, the presence of the optical functional film can provide a polarizing plate suitable for various applications. For example, the use of the linearly polarized light-separating film as the optical functional film can provide a polarizing plate that can contribute to an improvement in utilization efficiency of light from a backlight when applied to an image display apparatus. In addition, the optical functional film protects the polarizing film, and hence a construction having only one protective film can be adopted. When a thin polarizing film (having a thickness of 15 µm or less) is used as described above, and the optical functional film serves to protect the polarizing film, a polarizing plate having a function suitable for various applications and an extremely small thickness can be obtained. The thickness of the polarizing plate of the present invention is preferably 150 µm or less, more preferably 120 µm or less, still more preferably from 60 µm to 100 µm.

Figure 1B:
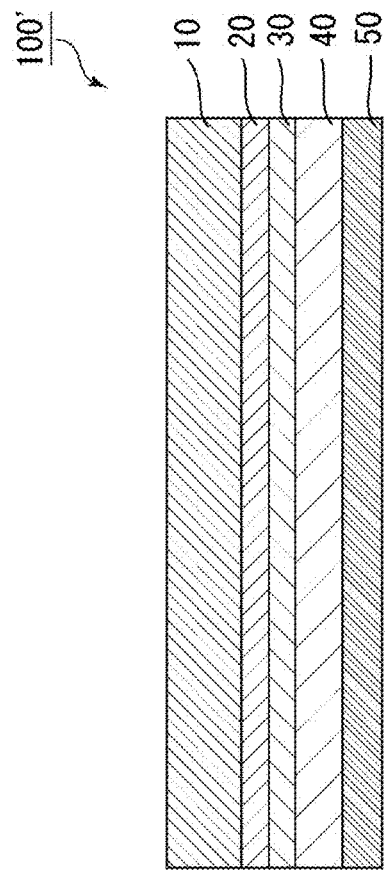

FIG. 1(b) is a schematic sectional view of a polarizing plate according to another embodiment of the present invention. In a polarizing plate 100' illustrated in FIG. 1(b), another pressure-sensitive adhesive layer 50 is arranged on the surface of the protective film 40 on aside opposite to the polarizing film 30. In the present invention, even in the case of a construction including the other pressure-sensitive adhesive layer 50 as described above, moisture absorbed by the other pressure-sensitive adhesive layer 50 can be prevented from being brought into contact with the polarizing film 30 by arranging the protective film 40 on one surface (surface on the lower side of the paper surface) of the polarizing film 30. As a result, the deterioration of the polarizing film 30 due to moisture is prevented. The other pressure-sensitive adhesive layer is formed of any appropriate pressure-sensitive adhesive. As a material for forming the other pressure-sensitive adhesive layer, there are given, for example, materials each using, as a base polymer, a polymer such as an acrylic polymer, a silicone-based polymer, polyester, polyurethane, polyamide, polyether, a fluorine-based polymer, a rubber-based polymer, an isocyanate-based polymer, a polyvinyl alcohol-based polymer, a gelatin-based polymer, a vinyl-based polymer, a latex-based polymer, or water-based polyester. Of those, a material using an acrylic polymer as a base polymer is preferred from the viewpoint of low moisture permeability. The thickness of the other pressure-sensitive adhesive layer is, for example, from 1 µm to 50 µm.

As illustrated in each of FIG. 1(a) and FIG. 1(b), in the polarizing plate of the present invention, the optical functional film 10 is arranged on one surface (surface on the upper side of the paper surface) of the polarizing film 30 through intermediation of the pressure-sensitive adhesive layer 20 having a thickness of 15 µm or less, and hence the penetration of moisture into the surface and an end portion of the pressure-sensitive adhesive layer is suppressed. As a result, the deterioration of the polarizing film 30 due to moisture particularly in a corner portion thereof is prevented.

In the present invention, as described above, the penetration of moisture is suppressed on each of both surfaces of the polarizing film 30, and hence the deterioration of the polarizing film 30 due to moisture is prevented. The polarizing plate of the present invention exhibiting such effect can be suitably used in a display apparatus for a mobile application that is assumed to be used under high temperature and high humidity.

In one embodiment, the polarizing plate of the present invention may be formed in an elongated shape (having a length of, for example, 100 m or more).

B. Polarizing Film

The thickness of the polarizing film is 15 µm or less, preferably 7 µm or less, more preferably 6 µm or less. The use of such thin polarizing film can provide a thin polarizing plate. Meanwhile, the thickness of the polarizing film is preferably 1 µm or more, more preferably 2 µm or more.

The polarizing film preferably exhibits absorption dichroism at any wavelength in the wavelength range of from 380 nm to 780 nm. The polarizing film has a single axis transmittance of preferably 40.0% or more, more preferably 41.0% or more, still more preferably 42.0% or more, particularly preferably 43.0% or more. The polarizing film has a polarization degree of preferably 99.8% or more, more preferably 99.9% or more, still more preferably 99.95% or more.

The polarizing film is preferably an iodine-based polarizing film. More specifically, the polarizing film may be formed of an iodine-containing polyvinyl alcohol-based resin (hereinafter referred to as "PVA-based resin") film.

Any appropriate resin may be adopted as a PVA-based resin for forming the PVA-based resin film. Examples of the resin include polyvinyl alcohol and an ethylene-vinyl alcohol copolymer. The polyvinyl alcohol is obtained by saponifying polyvinyl acetate. The ethylene-vinyl alcohol copolymer is obtained by saponifying an ethylene-vinyl acetate copolymer. The saponification degree of the PVA-based resin is typically from 85 mol % to 100 mol %, preferably from 95.0 mol % to 99.95 mol %, more preferably from 99.0 mol % to 99.93 mol %. The saponification degree may be determined in conformity with JIS K 6726-1994. The use of the PVA-based resin having such saponification degree can provide a polarizing film excellent in durability. When the saponification degree is excessively high, gelling may occur.

The average polymerization degree of the PVA-based resin may be appropriately selected depending on purposes. The average polymerization degree is typically from 1,000 to 10,000, preferably from 1,200 to 5,000, more preferably from 1,500 to 4,500. The average polymerization degree may be determined in conformity with JIS K 6726-1994.

A method of producing the polarizing film is, for example, a method (I) including stretching and dyeing a PVA-based resin film alone, or a method (II) including stretching and dyeing a laminate (i) having a resin substrate and a polyvinyl alcohol-based resin layer. Detailed description of the method (I) is omitted because the method is well known and conventionally used in the art. The production method (II) preferably includes the step of stretching and dyeing the laminate (i) having the resin substrate and the polyvinyl alcohol-based resin layer formed on at least one side of the resin substrate to produce a polarizing film on the resin substrate. The laminate (i) may be formed by applying an application liquid containing a polyvinyl alcohol-based resin onto the resin substrate and drying the applied liquid. In addition, the laminate (i) may be formed by transferring a polyvinyl alcohol-based resin film onto the resin substrate. Details about the production method (II) are disclosed in, for example, JP 2012-73580 A, which is incorporated herein by reference.

C. Protective Film

Any appropriate resin film may be adopted as the protective film. As a material for forming the protective film, there are given, for example: a cellulose-based resin, such as triacetylcellulose (TAC); a cycloolefin-based resin, such as a norbornene-based resin; an olefin-based resin, such as polyethylene or polypropylene; a polyester-based resin; and a (meth)acrylic resin. The term "(meth)acrylic resin" refers to an acrylic resin and/or a methacrylic resin.

The thickness of the protective film is preferably 40 μm or less, more preferably from 5 μm to 35 μm, still more preferably from 10 μm to 30 μm. The protective film may be subjected to various surface treatments.

The moisture permeability of the protective film is 1,000 g/m$^2$/24 h or less, preferably 140 g/m$^2$/24 h or less, more preferably 100 g/m$^2$/24 h or less, still more preferably 90 g/m$^2$/24 h or less. When the moisture permeability falls within such range, the deterioration of the polarizing film due to moisture can be prevented. A lower limit for the moisture permeability of the protective film is, for example, 1 g/m$^2$/24 h. The "moisture permeability" is a value determined by measuring the amount (g) of water vapor that passes a sample having an area of 1 m$^2$ within 24 hours in an atmosphere having a temperature of 40° C. and a humidity of 92% RH in conformity with the moisture permeability test (cup method) of JIS Z 0208.

In one embodiment, the protective film may also function as a retardation film. For example, when the polarizing plate of the present invention is applied to a liquid crystal display apparatus of an IPS mode, a retardation film having a refractive index ellipsoid of nx>ny>nz, a retardation film having a refractive index ellipsoid of nz>nx>ny, or a laminated film of these retardation films may be used as the protective film. The symbol "nx" represents a refractive index in a direction in which a refractive index in a film plane becomes maximum (i.e., a slow axis direction), the symbol "ny" represents a refractive index in a direction perpendicular to a slow axis in the film plane, and the symbol "nz" represents a refractive index in a thickness direction.

D. Optical Functional Film

Any appropriate film is used as the optical functional film. Examples thereof include a linearly polarized light-separating film that can function as a brightness enhancement film and a retardation film. Examples of the retardation film include films each including polyethylene terephthalate, a polycarbonate-based resin, or a cycloolefin-based resin. The retardation film may be a stretched film. In addition, in one embodiment, the retardation film may function as a λ/4 plate.

The moisture permeability of the optical functional film is 200 g/m$^2$/24 h or less, preferably 100 g/m$^2$/24 h or less, more preferably 80 g/m$^2$/24 h or less, still more preferably 50 g/m$^2$/24 h or less. When the moisture permeability falls within such range, the deterioration of the polarizing film due to moisture can be prevented. In one embodiment, the moisture permeability of the optical functional film is 4 g/m$^2$/24 hormone. In another embodiment, the moisture permeability of the optical functional film is 20 g/m$^2$/24 h or more.

The thickness of the optical functional film is preferably 50 μm or less, more preferably 40 μm or less, still more preferably from 10 μm to 40 μm, still further more preferably from 20 μm to 40 μm. When the thickness falls within such range, both the formation of an optical functional film having low moisture permeability and the thinning of the polarizing plate can be achieved.

D-1. Linearly Polarized Light-Separating Film

Figure 2:
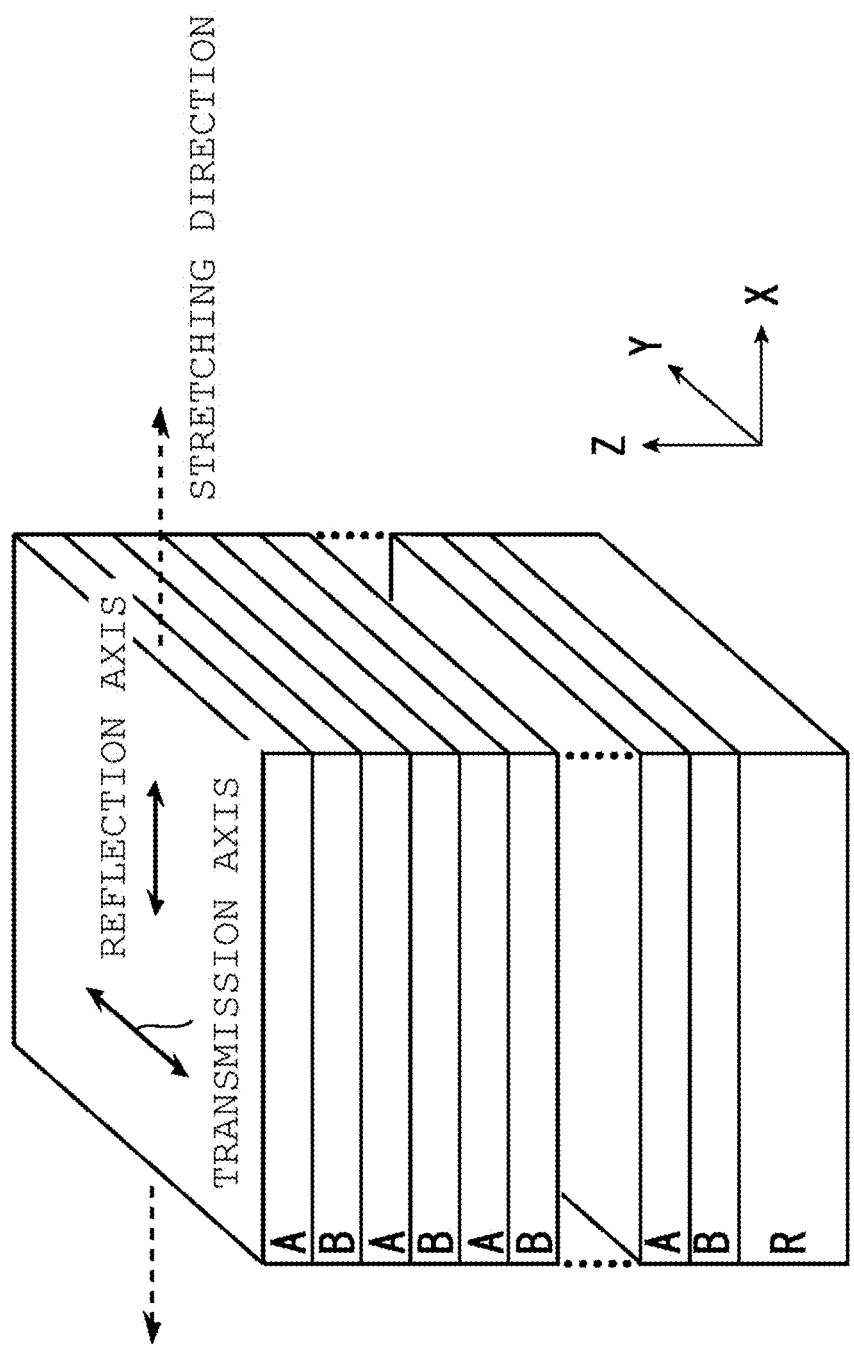
FIG. 2 is a schematic perspective view for illustrating an example of a linearly polarized light-separating film to be used in the polarizing plate of the present invention.

In one embodiment, as described above, a linearly polarized light-separating film is used as the optical functional film. FIG. 2 is a schematic perspective view for illustrating an example of the linearly polarized light-separating film. The linearly polarized light-separating film is preferably a multilayer laminate in which a layer A having birefringence and a layer B substantially free of birefringence are alternately laminated. For example, in the illustrated example, a refractive index n(X) of the layer A in an X-axis direction is larger than a refractive index n(Y) thereof in a Y-axis direction, and a refractive index n(X) of the layer B in the X-axis direction and a refractive index n(Y) thereof in the Y-axis direction are substantially equal to each other. Therefore, a difference in refractive index between the layer A and the layer B is large in the X-axis direction, and is substantially zero in the Y-axis direction. As a result, the X-axis direction serves as a reflection axis and the Y-axis direction serves as a transmission axis. The difference in refractive index between the layer A and the layer B in the X-axis direction is preferably from 0.2 to 0.3.

The layer A preferably includes a material that expresses birefringence when stretched. Typical examples of such material include naphthalene dicarboxylic acid polyester (e.g., polyethylene naphthalate), polycarbonate, and an acrylic resin (e.g., polymethyl methacrylate). Of those, polyethylene naphthalate or polycarbonate is preferred in terms of low moisture permeability. The layer B preferably includes a material that is substantially free from expressing birefringence even when stretched. Such material is typically, for example, a copolyester of naphthalene dicarboxylic acid and terephthalic acid.

At an interface between the layer A and the layer B, the linearly polarized light-separating film transmits light having a first polarization direction (e.g., a p-wave), and reflects light having a second polarization direction perpendicular to the first polarization direction (e.g., a s-wave). At the interface between the layer A and the layer B, part of the reflected light is transmitted as light having the first polarization direction, and the other part thereof is reflected as light having the second polarization direction. Such reflection and transmission are repeated many times in the linearly polarized light-separating film, and hence the utilization efficiency of light can be improved.

As illustrated in FIG. 2, the linearly polarized light-separating film preferably includes a reflective layer R serving as the outermost layer on the side opposite to a polarizing film. The arrangement of the reflective layer R enables further utilization of light that has finally returned to the outermost portion of the linearly polarized light-separating film without being utilized, and hence can further improve the utilization efficiency of light. The reflective layer R typically expresses its reflecting function by virtue of a multilayer structure including polyester resin layers.

The entire thickness of the linearly polarized light-separating film may be appropriately set in accordance with, for example, purposes and the total number of layers in the linearly polarized light-separating film. The entire thickness of the linearly polarized light-separating film is preferably 50 μm or less, more preferably 40 μm or less, still more preferably from 10 μm to 40 μm, still furthermore preferably from 20 μm to 40 μm. When the entire thickness falls within such range, both the formation of a linearly polarized light-separating film having low moisture permeability and the thinning of the polarizing plate can be achieved.

A film disclosed in, for example, JP 09-507308 A may be used as the linearly polarized light-separating film.

A commercial product may be used as it is as the linearly polarized light-separating film, or the commercial product may be used after having been subjected to secondary processing (e.g., stretching). Examples of the commercial product include a product available under the trade name "DBEF" from 3M Company and a product available under the trade name "APF" from 3M Company.

E. Pressure-sensitive Adhesive Layer

The polarizing film and the optical functional film are laminated through intermediation of the pressure-sensitive adhesive layer.

The thickness of the pressure-sensitive adhesive layer is 15 μm or less. When the optical functional film is arranged through intermediation of such thin pressure-sensitive adhesive layer, the deterioration of the polarizing film due to moisture is prevented. The thickness of the pressure-sensitive adhesive layer is preferably 10 μm or less, more preferably 5 μm or less. A lower limit value for the thickness of the pressure-sensitive adhesive layer is, for example, 1 μm.

The 50 μm-converted moisture permeability of the pressure-sensitive adhesive layer is 1,500 g/m$^2$/24 h or less, preferably 1,200 g/m$^2$/24 h or less, more preferably 1,000 g/m$^2$/24 h or less, still more preferably 500 g/m$^2$/24 h or less, particularly preferably 100 g/m$^2$/24 h or less, most preferably 50 g/m$^2$/24 h or less. When the 50 μm-converted moisture permeability falls within such range, the deterioration of the polarizing film due to moisture can be prevented even in a corner portion thereof. A lower limit value for the 50 μm-converted moisture permeability of the pressure-sensitive adhesive layer is, for example, 1 g/m$^2$/24 h. The term "50 μm-converted moisture permeability" as used herein refers to a value calculated by multiplying a moisture permeability measured by the method described in the section C by a ratio (50 μm/thickness (μm) of the pressure-sensitive adhesive layer).

In one embodiment, the 50 μm-converted moisture permeability of the pressure-sensitive adhesive layer is equal to or less than the 50 μm-converted moisture permeability of the optical functional film. Such pressure-sensitive adhesive layer can have a function of preventing the deterioration of the polarizing film due to moisture, and in a polarizing plate having the pressure-sensitive adhesive layer, an improving effect on the durability of the polarizing film becomes significant. A difference (50 μm-converted moisture permeability of the optical functional film-50 μm-converted moisture permeability of the pressure-sensitive adhesive layer) between the 50 μm-converted moisture permeability of the pressure-sensitive adhesive layer and the 50 μm-converted moisture permeability of the optical functional film is preferably 10 g/m$^2$/24 h or more, more preferably 50 g/m$^2$/24 h or more, still more preferably 100 g/m$^2$/24 h or more and less than 1,400 g/m$^2$/24 h.

The pressure-sensitive adhesive layer is formed of any appropriate pressure-sensitive adhesive. As a material for forming the pressure-sensitive adhesive layer, there are given, for example, materials each using, as a base polymer, a polymer such as an acrylic polymer, a silicone-based polymer, polyester, polyurethane, polyamide, polyether, a fluorine-based polymer, a rubber-based polymer, an isocyanate-based polymer, a polyvinyl alcohol-based polymer, a gelatin-based polymer, a vinyl-based polymer, a latex-based polymer, or water-based polyester. Of those, a material using, as a base polymer, an acrylic polymer and/or a rubber-based polymer is preferred from the viewpoint of low moisture permeability, and a material using a rubber-based polymer as a base polymer is more preferred.

A water-insoluble pressure-sensitive adhesive is preferably used. The use of the water-insoluble pressure-sensitive adhesive enables the formulation of a pressure-sensitive adhesive layer having low moisture permeability, and hence can prevent the deterioration of the polarizing film due to moisture.

F. Method of Producing Polarizing Plate

The polarizing plate may be produced by any appropriate production method. A method of producing the polarizing plate includes, for example, a step a of laminating the polarizing film and the protective film to form a laminate I, a step b of forming the pressure-sensitive adhesive layer on the optical functional film to provide a laminate II, and a step c of bonding the polarizing film of the laminate I and the optical functional film of the laminate II to each other through intermediation of the pressure-sensitive adhesive layer. When the polarizing plate has another pressure-sensitive adhesive layer on the surface of the protective film on the side opposite to the polarizing film, the method of producing the polarizing plate may include a step a' of laminating the polarizing film, the protective film, and the other pressure-sensitive adhesive layer instead of the step a. In addition, when the resin substrate at the time of the formulation of the polarizing film is used as the protective film, i.e., when a polarizing film with a resin substrate is used in the method of producing the polarizing plate, the step of laminating the polarizing film and the protective film is omitted.

In one embodiment, in the step a or the step a', the lamination of the polarizing film and the protective film is performed by a roll-to-roll process. It is preferred that an elongated polarizing film that is obtained in a method of producing a polarizing film described in the section B-1 through a MD stretching step and has an absorption axis in its lengthwise direction, and an elongated protective film be laminated through intermediation of an adhesive to provide the laminate I.

The step a is preferably performed under heating. As described later, when the adhesive is an aqueous adhesive or a solvent-based adhesive, a heating temperature is a temperature at which the adhesive dries, and when the adhesive is an active energy ray-curable adhesive, the heating temperature is a temperature at which the adhesive cures. The heating temperature is preferably 50° C. or more, more preferably 55° C. or more, still more preferably 60° C. or more. Meanwhile, the heating temperature is preferably 80° C. or less. The heating to be performed in the lamination of the protective film may also serve as a drying treatment for the laminate.

Any appropriate adhesive may be adopted as the adhesive to be used in the lamination of the protective film and the polarizing film. Specifically, the adhesive may be an aqueous adhesive, may be a solvent-based adhesive, or may be an active energy ray-curable adhesive.

Any appropriate adhesive may be used as the active energy ray-curable adhesive as long as the adhesive can be cured by being irradiated with an active energy ray. Examples of the active energy ray-curable adhesive include a UV-curable adhesive and an electron beam-curable adhesive. Specific examples of the curing type of the active energy ray-curable adhesive include a radical curing type, a cation curing type, an anion curing type, and a combination thereof (e.g., a hybrid of the radical curing type and the cation curing type).

Examples of the active energy ray-curable adhesive include adhesives containing, as curable components, compounds (such as monomers and/or oligomers) each having a radically polymerizable group, such as a (meth)acrylate group or a (meth)acrylamide group.

Specific examples of the active energy ray-curable adhesive and a method of curing the adhesive are disclosed in, for example, JP 2012-144690 A. The disclosure is incorporated herein by reference.

Any appropriate aqueous adhesive may be adopted as the aqueous adhesive. An aqueous adhesive containing a PVA-based resin is preferably used. The average polymerization degree of the PVA-based resin to be incorporated into the aqueous adhesive is preferably from about 100 to about 5,500, more preferably from 1,000 to 4,500 in terms of an adhesive property. The average saponification degree of the PVA-based resin is preferably from about 85 mol % to about 100 mol %, more preferably from 90 mol % to 100 mol % in tams of the adhesive property.

The PVA-based resin to be incorporated into the aqueous adhesive preferably contains an acetoacetyl group. This is because adhesiveness between a PVA-based resin layer and the protective film is excellent, and the polarizing plate can be excellent in durability. An acetoacetyl group-containing PVA-based resin is obtained by, for example, causing the PVA-based resin and diketene to react with each other according to any appropriate method. The acetoacetyl group modification degree of the acetoacetyl group-containing PVA-based resin is typically 0.1 mol % or more, preferably from about 0.1 mol % to about 40 mol %, more preferably from 1 mol % to 20 mol %, still more preferably from 1 mol % to 7 mol %. The acetoacetyl group modification degree is a value measured by NMR.

The resin concentration of the aqueous adhesive is preferably from 0.1 wt % to 15 wt %, more preferably from 0.5 wt % to 10 wt %.

The thickness of the adhesive at the time of its application may be set to any appropriate value. For example, the setting is performed so that an adhesive layer having a desired thickness may be obtained after the curing or heating (drying) of the adhesive. The thickness of the adhesive layer is preferably from 0.01 μm to 7 μm, more preferably from 0.01 μm to 5 μm, still more preferably from 0.01 μm to 2 μm, most preferably from 0.01 μm to 1 μm.

In the step b, the pressure-sensitive adhesive layer is formed on the optical functional film by applying a pressure-sensitive adhesive to the optical functional film. The polarizing plate of the present invention has the construction in which the pressure-sensitive adhesive layer is arranged between the optical functional film and the polarizing film, and hence the optical functional film with a pressure-sensitive adhesive layer (laminate I) may be prepared in a roll shape at the time of the production of the polarizing plate. When the laminate I is prepared in a roll shape, the bonding of the laminate I and the laminate II (step c) can be performed by a roll-to-roll process.

The polarizing plate of the present invention is excellent in productivity because the production of the laminate I (protective film/polarizing film), the production of the laminate II (pressure-sensitive adhesive layer/optical functional film) and the bonding of the laminate I and the laminate II to each other can be performed by the roll-to-roll process as described above. According to the present invention, there can be obtained a polarizing plate having the following feature: the polarizing plate includes a pressure-sensitive adhesive layer and is hence excellent in productivity, and prevents the deterioration of a polarizing film due to moisture despite the presence of the pressure-sensitive adhesive layer.

EXAMPLES

The present invention is specifically described below by way of Examples. However, the present invention is not limited to Examples below. Methods of measuring respective characteristics are as described below.

1. Thickness

Measurement was performed with a digital micrometer (manufactured by Anritsu Corporation, product name: "KC-351C").

2. Moisture Permeability

The amount (g) of water vapor passing a sample having an area of 1 $m^2$ within 24 hours in an atmosphere having a temperature of 40° C. and a humidity of 92% RH was measured in conformity with the moisture permeability test (cup method) of JIS Z 0208.

The 50 μm-converted moisture permeability of a pressure-sensitive adhesive layer was calculated by multiplying the measured value obtained by the measurement by a ratio (50 μm/thickness (μm) of the pressure-sensitive adhesive layer).

3. Durability (Decoloring of Corner Portion)

The resultant polarizing plate was evaluated for its durability as described below. After a separator had been peeled, a polarizing plate and a no-alkali glass were bonded to each other through intermediation of a pressure-sensitive adhesive layer (another pressure-sensitive adhesive layer) formed on the outermost side of the polarizing plate to produce an evaluation sample. The evaluation sample was subjected to an autoclave treatment at 50° C. and 5 atm for 15 minutes, and was then loaded into a thermohygrostat at 65° C. and 90% RH, and left to stand for 500 hours. The extent to which iodine was decolored in the polarizing film of the evaluation sample after a lapse of 500 hours was observed with an optical microscope. In an iodine-decolored portion occurring in a corner portion of the polarizing film, the extent to which iodine was decolored, i.e., the durability of the polarizing plate was evaluated on the basis of a distance between an inner end portion of the iodine-decolored portion and the corner portion of the polarizing film. As the distance becomes shorter, the extent to which iodine is decolored becomes smaller and hence the durability becomes more excellent.

Example 1

Production of Laminate I (Polarizing Film/Protective Film)

A laminate obtained by forming a polyvinyl alcohol (PVA) layer having a thickness of 9 μm on an amorphous PET substrate was subjected to aerial auxiliary stretching (stretching temperature: 130° C.) to produce a stretched laminate. Next, the stretched laminate was immersed in a dyeing liquid, which contained 0.1 part by weight of iodine and 0.7 part by weight of potassium iodide with respect to 100 parts by weight of water, for 60 seconds to produce a colored laminate. Further, the colored laminate was stretched in a boric acid solution (stretching temperature: 65° C.). The total stretching ratio of the stretching treatments was set to 5.94 times. The foregoing operation provided an optical film laminate (substrate/polarizing film) including the amorphous PET substrate and the integrally stretched PVA layer having a thickness of 4 μm. Further, while a PVA-based adhesive was applied to the surface of the polarizing film of the optical film laminate, a protective film having a thickness of 20 μm (acrylic resin film, moisture permeability: 140 g/m$^2$/24 h) was bonded thereto. After that, the amorphous PET substrate was peeled. Thus, a laminate I having the thin iodine-based polarizing film and the protective film arranged on one side of the polarizing film was obtained.

<Production of Laminate I' (Polarizing Film/Protective Film/Another Pressure-Sensitive Adhesive Layer(/Separator))>

99 Parts by weight of butyl acrylate and 1 part by weight of 4-hydroxybutyl acrylate, and 1 part by weight of AIBN serving as an initiator with respect to 100 parts by weight of the monomers (solid content) were loaded into a reaction vessel including a cooling tube, a nitrogen-introducing tube, a temperature gauge, and a stirring apparatus together with ethyl acetate, and the mixture was subjected to a reaction at 60° C. for 7 hours in a stream of a nitrogen gas. After that, ethyl acetate was added to the reaction liquid. Thus, a solution containing an acrylic polymer having a weight-average molecular weight of 1,600,000 was obtained (solid content concentration: 30 wt %). The solution was compounded with 0.1 part by weight of trimethylolpropane xylylene diisocyanate (manufactured by Mitsui Chemicals, Inc., trade name: "TAKENATE D110N"), 0.3 part by weight of dibenzoyl peroxide, and 0.1 part by weight of γ-glycidoxypropyltrimethoxysilane (manufactured by Shin-Etsu Chemical Co., Ltd., trade name: "KBM-403") serving as cross-linking agents per 100 parts by weight of the solid content of the acrylic polymer solution. Thus, a pressure-sensitive adhesive solution a was obtained.

The pressure-sensitive adhesive solution a was uniformly applied to the surface of a polyethylene terephthalate film (separator), which had been treated with a silicone-based peeling agent, with a fountain coater, and was dried in an air circulation-type thermostatic oven at 155° C. for 2 minutes to form a pressure-sensitive adhesive layer having a thickness of 20 μm (another pressure-sensitive adhesive layer) on the surface of the separator. Next, the pressure-sensitive adhesive layer (other pressure-sensitive adhesive layer) with the separator was bonded to the protective film side of the laminate I. Thus, a laminate I' (polarizing film/protective film/other pressure-sensitive adhesive layer/separator) was obtained.

<Production of Laminate II (Pressure-Sensitive Adhesive Layer/Linearly Polarized Light-Separating Film)>

100 Parts by weight of butyl acrylate, 5 parts by weight of acrylic acid, and 0.075 part by weight of hydroxyethyl acrylate, and 1 part by weight of AIBN serving as an initiator with respect to 100 parts by weight of the monomers (solid content) were loaded into a reaction vessel including a cooling tube, a nitrogen-introducing tube, a temperature gauge, and a stirring apparatus together with ethyl acetate, and the mixture was subjected to a reaction at 60° C. for 7 hours in a stream of a nitrogen gas. After that, ethyl acetate was added to the reaction liquid. Thus, a solution containing an acrylic polymer having a weight-average molecular weight of 2,200,000 was obtained (solid content concentration: 30 wt %). The solution was compounded with 0.6 part by weight of a cross-linking agent (adduct body of tolylene diisocyanate and trimethylolpropane, manufactured by Nippon Polyurethane Industry Co., Ltd., trade name: "CORONATE L") and 0.075 part by weight of γ-glycidoxypropyltrimethoxysilane (manufactured by Shin-Etsu Chemical Co., Ltd., "KBM-403") per 100 parts by weight of the solid content of the acrylic polymer solution. Thus, a pressure-sensitive adhesive solution b was obtained.

The pressure-sensitive adhesive solution b was uniformly applied to the surface of a polyethylene terephthalate film (separator), which had been treated with a silicone-based peeling agent, with a fountain coater, and was dried in an air circulation-type thermostatic oven at 155° C. for 2 minutes to form a pressure-sensitive adhesive layer having a thickness of 5 μm (50 μm-converted moisture permeability: 1,400 g/m$^2$/24 h) on the surface of the separator. Next, the pressure-sensitive adhesive layer with the separator was bonded to a linearly polarized light-separating film having a thickness of 20 μm (manufactured by 3M Company, trade name: "DBEF", moisture permeability: 45 g/m$^2$/24 h). Thus, a laminate II (pressure-sensitive adhesive layer/linearly polarized light-separating film) with the separator was obtained.

<Production of Polarizing Plate>

The separator of the laminate II was peeled, and the pressure-sensitive adhesive layer of the laminate II and the polarizing film of the laminate I' were bonded to each other. Thus, a polarizing plate (linearly polarized light-separating film (20 μm)/pressure-sensitive adhesive layer (5 μm)/polarizing film (4 μm)/protective film (20 μm)/other pressure-sensitive adhesive layer (/separator)) was obtained. The laminate I' and the laminate II were laminated so that the transmission axis of the polarizing film and the transmission axis of the linearly polarized light-separating film were parallel to each other.

The resultant polarizing plate was subjected to the evaluation 3 (durability evaluation). The result is shown in Table 1.

Example 2

A polarizing plate was obtained in the same manner as in Example 1 except that the thickness of the pressure-sensitive adhesive layer in the laminate II was changed to 12 μm. The resultant polarizing plate was subjected to the same evaluation as that of Example 1. The result is shown in Table 1.

Example 3

A polarizing plate was obtained in the same manner as in Example 1 except that a polyethylene terephthalate film (thickness: 5 μm, moisture permeability: 140 g/m$^2$/24 h) was used instead of the linearly polarized light-separating film. The resultant polarizing plate was subjected to the same evaluation as that of Example 1. The result is shown in Table 1.

Example 4

A polarizing plate was obtained in the same manner as in Example 1 except that a protective film having a thickness of 13 μm (cycloolefin-based resin film, moisture permeability: 12 g/m$^2$/24 h) was used instead of the protective film having a thickness of 20 μm (acrylic resin film, moisture permeability: 140 g/m$^2$/24 h). The resultant polarizing plate was subjected to the same evaluation as that of Example 1. The result is shown in Table 1.

Example 5

A polarizing plate was obtained in the same manner as in Example 1 except that the following pressure-sensitive adhesive solution c was used instead of the pressure-sensitive adhesive solution b. A pressure-sensitive adhesive layer formed of the pressure-sensitive adhesive solution c had a thickness of 5 μm and a 50 μm-converted moisture permeability of 50 g/m$^2$/24 h. The resultant polarizing plate was subjected to the same evaluation as that of Example 1. The result is shown in Table 1.
(Preparation of Pressure-Sensitive Adhesive Solution c)

The solid content of a toluene solution (pressure-sensitive adhesive solution) obtained by compounding 100 parts by weight of a styrene/ethylene-propylene copolymer/styrene block polymer (manufactured by Kuraray Co., Ltd., trade name: "SEPTON 2063", styrene content: 13 wt %) with 10 parts by weight of polybutene (manufactured by JX Nikko Nisseki Energy, trade name: "NISSEKI POLYBUTENE HV-300"), 40 parts by weight of a terpene phenol tackifier (manufactured by Yasuhara Chemical Co., Ltd., trade name: "YS POLYSTER TH130"), and an aromatic tackifier (manufactured by Eastman Chemical Company, trade name: "PICCOLASTIC A5") was adjusted to 30 wt %. Thus, the pressure-sensitive adhesive solution c was obtained.

Example 6

A polarizing plate was obtained in the same manner as in Example 5 except that the thickness of the pressure-sensitive adhesive layer was changed to 12 μm. The resultant polarizing plate was subjected to the same evaluation as that of Example 1. The result is shown in Table 1.

Example 7

A polarizing plate was obtained in the same manner as in Example 1 except that: a protective film having a thickness of 13 μm (cycloolefin-based resin film, moisture permeability: 12 g/m$^2$/24 h) was used instead of the protective film having a thickness of 20 μm (acrylic resin film, moisture permeability: 140 g/m$^2$/24 h); the pressure-sensitive adhesive solution c was used instead of the pressure-sensitive adhesive solution b; and the thickness of the pressure-sensitive adhesive layer was changed to 12 μm. The resultant polarizing plate was subjected to the same evaluation as that of Example 1. The result is shown in Table 1.

Example 8

Figure 3B:
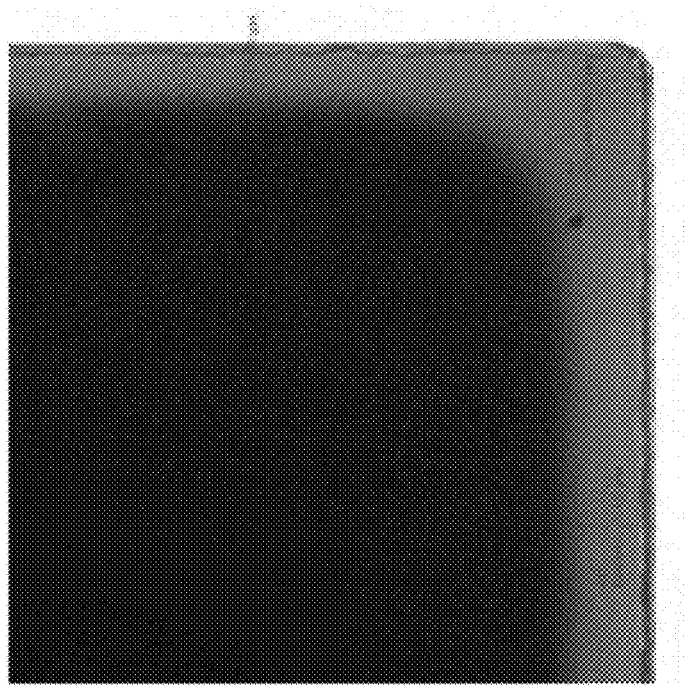
FIG. 3 (a) is a photograph view for showing the appearance of a corner portion of a polarizing plate obtained in Example 8, and FIG. 3 (b) is a photograph view for showing the appearance of a corner portion of a polarizing plate obtained in Comparative Example 1.
Figure 3A:
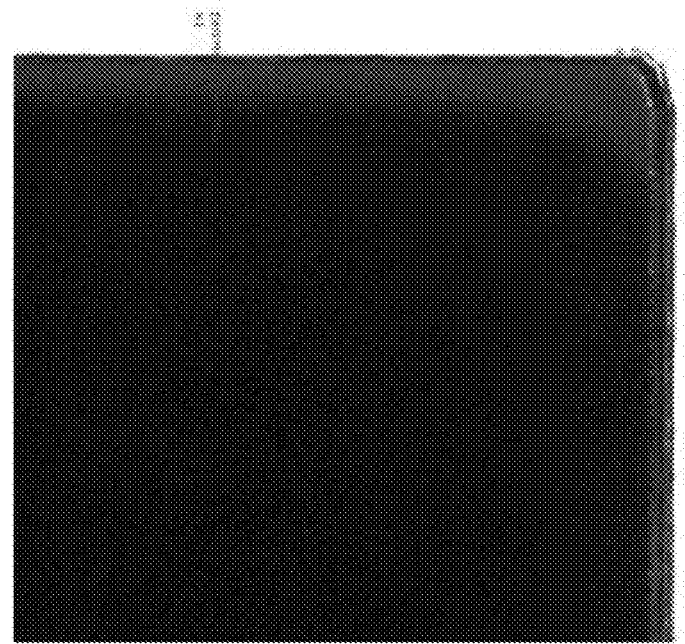

A polarizing plate was obtained in the same manner as in Example 1 except that: the following pressure-sensitive adhesive solution d was used instead of the pressure-sensitive adhesive solution b; and the thickness of the pressure-sensitive adhesive layer was changed to 12 μm. A pressure-sensitive adhesive layer formed of the pressure-sensitive adhesive solution d had a 50 μm-converted moisture permeability of 10 g/m$^2$/24 h. The resultant polarizing plate was subjected to the same evaluation as that of Example 1. The result is shown in Table 1. In addition, the appearance of a corner of the resultant polarizing plate was observed with a microscope. The resultant micrograph is shown in FIG. 3(a).
(Preparation of Pressure-Sensitive Adhesive Solution d)

The solid content of a toluene solution (pressure-sensitive adhesive solution) obtained by compounding 100 parts by weight of polyisobutylene (manufactured by BASF, trade name: "Oppanol B80") with 10 parts by weight of a hydrogenated terpene phenol tackifier (manufactured by Yasuhara Chemical Co., Ltd., YS POLYSTER UH115) was adjusted to 20 wt %. Thus, the pressure-sensitive adhesive solution d was obtained.

Comparative Example 1

A laminate I was obtained in the same manner as in Example 1.

A pressure-sensitive adhesive solution a was obtained in the same manner as in Example 1. The pressure-sensitive adhesive solution a was uniformly applied to the surface of a polyethylene terephthalate film (separator), which had been treated with a silicone-based peeling agent, with a fountain coater, and was dried in an air circulation-type thermostatic oven at 155° C. for 2 minutes to form a pressure-sensitive adhesive layer having a thickness of 20 μm (another pressure-sensitive adhesive layer) on the surface of the separator. Next, the pressure-sensitive adhesive layer (other pressure-sensitive adhesive layer) with the separator was bonded to the polarizing film side of the laminate I. Thus, a laminate C (protective film/polarizing film/other pressure-sensitive adhesive layer/separator) was obtained.

A laminate II (pressure-sensitive adhesive layer/linearly polarized light-separating film) was obtained in the same manner as in Example 1.

The separator of the laminate C was peeled, and the pressure-sensitive adhesive layer of the laminate II and the protective film of the laminate C were bonded to each other. Thus, a polarizing plate (linearly polarized light-separating film (20 μm)/pressure-sensitive adhesive layer (5 μm)/protective film (20 μm)/polarizing film (4 μm)/other pressure-sensitive adhesive layer(/separator)) was obtained. The laminate C and the laminate II were laminated so that the transmission axis of the polarizing film and the transmission axis of the linearly polarized light-separating film were parallel to each other.

The resultant polarizing plate was subjected to the evaluation 3 (durability evaluation). The result is shown in Table 1.

In addition, the appearance of a corner of the resultant polarizing plate was observed with a microscope (at the same magnification as that of Example 8). The resultant micrograph is shown in FIG. 3(b).

Comparative Example 2

A polarizing plate was obtained in the same manner as in Example 1 except that the thickness of the pressure-sensitive adhesive layer in the laminate II was changed to 20 μm. The resultant polarizing plate was subjected to the same evaluation as that of Example 1. The result is shown in Table 1.

Comparative Example 3

A polarizing plate was obtained in the same manner as in Example 1 except that: at the time of the formulation of the laminate II, the pressure-sensitive adhesive solution a (pressure-sensitive adhesive solution used at the time of the production of the laminate I' in Example 1, 50 μm-converted moisture permeability: 1, 400 g/m²/24 h) was used instead of the pressure-sensitive adhesive solution b; and the thickness of the pressure-sensitive adhesive layer was changed to 20 μm. The resultant polarizing plate was subjected to the same evaluation as that of Example 1. The result is shown in Table 1.

TABLE 1

| | | Pressure-sensitive adhesive layer | | | Linearly polarized light-separating film or PET film | | | Protective film | | | Durability <decoloring of corner portion> (μm) |
|---|---|---|---|---|---|---|---|---|---|---|---|
| | Construction | Pressure-sensitive adhesive solution | Thickness (μm) | 50 μm-converted moisture permeability (g/m²/24 h) | Kind | Thickness (μm) | Moisture permeability (g/m²/24 h) | Material | Thickness (μm) | Moisture permeability (g/m²/24 h) | |
| Example 1 | Linearly polarized light-separating film Pressure-sensitive adhesive layer Polarizing film Protective film Another pressure-sensitive adhesive layer | b (Acrylic) | 5 | 1,400 | Linearly polarized light-separating film | 20 | 45 | Acrylic | 20 | 140 | 320 |
| Example 2 | Linearly polarized light-separating film Pressure-sensitive adhesive layer Polarizing film Protective film Another pressure-sensitive adhesive layer | b (Acrylic) | 12 | 1,400 | Linearly polarized light-separating film | 20 | 45 | Acrylic | 20 | 140 | 350 |
| Example 3 | PET film Pressure-sensitive adhesive layer Polarizing film Protective film Another pressure-sensitive adhesive layer | b (Acrylic) | 5 | 1,400 | PET film | 5 | 140 | Acrylic | 20 | 140 | 330 |
| Example 4 | Linearly polarized light-separating film Pressure-sensitive adhesive layer Polarizing film Protective film Another pressure-sensitive adhesive layer | b (Acrylic) | 5 | 1,400 | Linearly polarized light-separating film | 20 | 45 | Cyclo-olefin-based | 13 | 12 | 250 |
| Example 5 | Linearly polarized light-separating film Pressure-sensitive adhesive layer Polarizing film Protective film Another pressure-sensitive adhesive layer | c (Rubber-based) | 5 | 50 | Linearly polarized light-separating film | 20 | 45 | Acrylic | 20 | 140 | 300 |

TABLE 1-continued

| | | Pressure-sensitive adhesive layer | | | Linearly polarized light-separating film or PET film | | Protective film | | | |
|---|---|---|---|---|---|---|---|---|---|---|
| | Construction | Pressure-sensitive adhesive solution | Thickness (μm) | 50 μm-converted moisture permeability (g/m²/24 h) | Kind | Thickness (μm) | Moisture permeability (g/m²/24 h) | Material | Thickness (μm) | Moisture permeability (g/m²/24 h) | Durability <decoloring of corner portion> (μm) |
| Example 6 | PET film Pressure-sensitive adhesive layer Polarizing film Protective film Another pressure-sensitive adhesive layer | c (Rubber-based) | 12 | 50 | Linearly polarized light-separating film | 20 | 45 | Acrylic | 20 | 140 | 200 |
| Example 7 | Linearly polarized light-separating film Pressure-sensitive adhesive layer Polarizing film Protective film Another pressure-sensitive adhesive layer | c (Rubber-based) | 12 | 50 | Linearly polarized light-separating film | 20 | 45 | Cyclo-olefin-based | 13 | 12 | 200 |
| Example 8 | PET film Pressure-sensitive adhesive layer Polarizing film Protective film Another pressure-sensitive adhesive layer | d (Rubber-based) | 12 | 10 | Linearly polarized light-separating film | 20 | 45 | Acrylic | 20 | 140 | 200 |
| Comparative Example 1 | Linearly polarized light-separating film Pressure-sensitive adhesive layer Protective film Polarizing film Another pressure-sensitive adhesive layer | b (Acrylic) | 5 | 1,400 | Linearly polarized light-separating film | 20 | 45 | Acrylic | 20 | 140 | 500 |
| Comparative Example 2 | Linearly polarized light-separating film Pressure-sensitive adhesive layer Polarizing film Protective film Another pressure-sensitive adhesive layer | b (Acrylic) | 20 | 1,400 | Linearly polarized light-separating film | 20 | 45 | Acrylic | 20 | 140 | 440 |
| Comparative Example 3 | Linearly polarized light-separating film Pressure-sensitive adhesive layer Polarizing film Protective film Another pressure-sensitive adhesive layer | a (Acrylic) | 20 | 1,400 | Linearly polarized light-separating film | 20 | 45 | Acrylic | 20 | 140 | 440 |

INDUSTRIAL APPLICABILITY

The polarizing plate of the present invention is suitably used for liquid crystal televisions, liquid crystal displays, liquid crystal panels of, for example, mobile phones, digital cameras, video cameras, portable game machines, car navigation systems, copying machines, printers, facsimile machines, timepieces, and microwave ovens, and anti-reflection plates of organic EL devices.

REFERENCE SIGNS LIST

10 optical functional film
20 pressure-sensitive adhesive layer
30 polarizing film
40 protective film
100 polarizing plate

The invention claimed is:

1. A polarizing plate, comprising an optical functional film, a pressure-sensitive adhesive layer, a polarizing film, and a protective film in the stated order, wherein:
   the polarizing film has a thickness of 15 μm or less;
   the pressure-sensitive adhesive layer has a thickness of 15 μm or less;
   the optical functional film has a moisture permeability of 200 $g/m^2/24$ h or less; and
   the protective film has a moisture permeability of 1,000 $g/m^2/24$ h or less, and
   the pressure-sensitive adhesive layer has a 50 μm-converted moisture permeability of 1,500 $g/m^2/24$ h or less.

2. The polarizing plate according to claim 1, wherein the pressure-sensitive adhesive layer has a 50 μm-converted moisture permeability equal to or less than a 50 μm-converted moisture permeability of the optical functional film.

3. The polarizing plate according to claim 1, wherein the pressure-sensitive adhesive layer has a thickness of 5 μm or less.

4. The polarizing plate according to claim 1, wherein the polarizing film comprises an iodine-based polarizing film.

5. The polarizing plate according to claim 1, wherein the optical functional film has a thickness of 40 μm or less.

6. The polarizing plate according to claim 1, wherein the protective film has a thickness of 40 μm or less.

7. The polarizing plate according to claim 1, wherein the polarizing plate has a thickness of 150 μm or less.

\* \* \* \* \*

UNITED STATES PATENT AND TRADEMARK OFFICE
CERTIFICATE OF CORRECTION

| | |
|---|---|
| PATENT NO. | : 10,274,659 B2 |
| APPLICATION NO. | : 15/512328 |
| DATED | : April 30, 2019 |
| INVENTOR(S) | : Akinori Izaki et al. |

It is certified that error appears in the above-identified patent and that said Letters Patent is hereby corrected as shown below:

In the Claims

Column 20 Line 2, Claim 1:
Delete: "200 g/m2/24 h or less; "and""
Insert: --200 g/m2/24 h or less;--

Signed and Sealed this
Sixth Day of August, 2019

Andrei Iancu
*Director of the United States Patent and Trademark Office*